United States Patent
Zhuo et al.

(10) Patent No.: US 12,415,956 B2
(45) Date of Patent: Sep. 16, 2025

(54) DISPERSANT AND METHOD OF PREPARATION THEREOF, SLURRY COMPOSITION AND METHOD OF PREPARATION THEREOF, ELECTRODE PLATE AND APPARATUS CONTAINING THE ELECTRODE PLATE

(71) Applicant: CONTEMPORARY AMPEREX TECHNOLOGY (HONG KONG) LIMITED, Hong Kong (CN)

(72) Inventors: Guopeng Zhuo, Fujian (CN); Yunpeng Xu, Fujian (CN); Yanying Wu, Fujian (CN); Xinghui Wang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 116 days.

(21) Appl. No.: 18/382,648

(22) Filed: Oct. 23, 2023

(65) Prior Publication Data

US 2024/0052244 A1 Feb. 15, 2024

Related U.S. Application Data

(63) Continuation of application No. PCT/CN2022/104663, filed on Jul. 8, 2022.

(51) Int. Cl.
*C09K 23/52* (2022.01)
*H01M 4/04* (2006.01)
*H01M 4/02* (2006.01)

(52) U.S. Cl.
CPC ........... *C09K 23/52* (2022.01); *H01M 4/0404* (2013.01); *H01M 2004/028* (2013.01)

(58) Field of Classification Search
None
See application file for complete search history.

(56) References Cited

U.S. PATENT DOCUMENTS

2021/0087320 A1   3/2021   Shooter et al.

FOREIGN PATENT DOCUMENTS

| CN | 102983306 A | 3/2013 |
|---|---|---|
| CN | 103208631 B | 2/2016 |
| CN | 106299269 A | 1/2017 |
| CN | 107591537 A | 1/2018 |
| CN | 108431064 A | 8/2018 |
| CN | 108699201 A | 10/2018 |
| CN | 108987754 A | 12/2018 |
| CN | 110896144 A | 3/2020 |
| CN | 112271285 A | 1/2021 |
| CN | 112542585 A | 3/2021 |
| CN | 113036141 A | 6/2021 |
| CN | 113613768 A | 11/2021 |
| CN | 113795952 A | 12/2021 |
| CN | 114641850 A | 6/2022 |
| JP | 2018-203795 A | 12/2018 |

OTHER PUBLICATIONS

Extended European Search Report issued Jul. 3, 2024 in European Patent Application No. 22936713.1.
International Search Report mailed on Mar. 24, 2023, received for PCT Application PCT/CN2022/104663, filed on Jul. 8, 2022, 6 pages including English Translation.

*Primary Examiner* — Carlos Barcena
(74) *Attorney, Agent, or Firm* — XSENSUS LLP

(57) ABSTRACT

The present application provides a dispersant and a preparation method thereof, a slurry composition and a preparation method thereof, an electrode, and an apparatus containing the electrode plate. The dispersant includes a block copolymer having a first block and a second block, the first block includes a first repeating structural unit shown in Formula I) and a second repeating structural unit shown in Formula II), and the second block includes a third repeating structural unit shown in Formula III) and a fourth repeating structural unit shown in Formula IV), in which n is any integer from 1-25, $R_1$ to $R_7$ are independently selected from hydrogen, halogen, cyano, carbonyl, carboxy, nitro, sulfonyl, amide, ester, substituted or unsubstituted $C_1$-$C_{15}$ alkyl or alkoxy, and substituted or unsubstituted $C_6$-$C_{30}$ aryl and $R_8$, $R_9$, and $R_{10}$ have a dipole moment of greater than $2 \times 10^{-30}$ C·m.

15 Claims, 3 Drawing Sheets

DISPERSANT AND METHOD OF PREPARATION THEREOF, SLURRY COMPOSITION AND METHOD OF PREPARATION THEREOF, ELECTRODE PLATE AND APPARATUS CONTAINING THE ELECTRODE PLATE

CROSS-REFERENCE TO RELATED APPLICATION

This application is a Continuation of International Application No. PCT/CN2022/104663 filed on Jul. 8, 2022, which is incorporated herein by reference in its entirety.

TECHNICAL FIELD

The present application belongs to the technical field of battery, in particular to a dispersant and a preparation method thereof, a slurry composition and a preparation method thereof, an electrode electrode, and an apparatus containing the electrode plate.

BACKGROUND

Batteries are widely used in electric devices such as cellular phones, tablet computers, laptops, electric vehicles, and other electric devices because of their advantages of high energy density, rechargeability, and good cycle performance. With the development of battery technology, higher and higher requirements are placed on performance of batteries, such as cycle performance. Stability of an electrode slurry is crucial to performances of batteries. Therefore, how to improve the stability of an electrode slurry is an urgent problem in battery technology.

SUMMARY

The present application provides a dispersant and a preparation method thereof, a slurry composition and a preparation method thereof, an electrode plate, and an electric device containing the electrode plate, and is capable of improving stability of the slurry.

In a first aspect, embodiments of the present application provide a dispersant comprising a block copolymer having a first block and a second block;

said first block comprises a first repeating structural unit shown in Formula I) and a second repeating structural unit shown in Formula II):

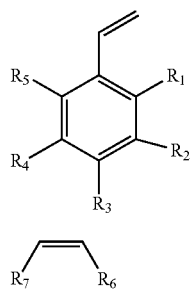

wherein $R_1$, $R_2$, $R_3$, $R_4$, $R_5$, $R_6$, and $R_7$ are independently selected from hydrogen, halogen, cyano, carbonyl, carboxy, nitro, sulfonyl, amide, ester, substituted or unsubstituted $C_1$-$C_{15}$ alkyl, substituted or unsubstituted $C_1$-$C_{15}$ alkoxy, and substituted or unsubstituted $C_6$-$C_{30}$ aryl;

said second block comprises a third repeating structural unit shown in Formula III) and a fourth repeating structural unit shown in Formula IV):

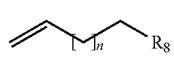

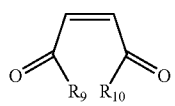

wherein n represents an average degree of polymerization, that is any integer from 1-25 and $R_8$, $R_9$, and $R_{10}$ have a dipole moment of greater than $2 \times 10^{-30}$ C·m;

optionally, $R_8$, $R_9$, and $R_{10}$ are independently selected from hydroxyl, carboxyl, pyrrolidone, ethylene oxide, propylene oxide, halogen, substituted or unsubstituted $C_1$-$C_{15}$ alkyl, and substituted or unsubstituted $C_1$-$C_{15}$ alkoxy, wherein $R_9$ and $R_{10}$ may be joined together as $R_9$—O—$R_{10}$ or $R_9$—NH—$R_{10}$.

In the above embodiments, the dispersant is a block copolymer having a first block and a second block, wherein the first block comprises a first repeating structural unit shown in Formula I) and a second repeating structural unit shown in Formula II), and the second block comprises a third repeating structural unit shown in Formula III) and a fourth repeating structural unit shown in Formula IV), wherein the above mentioned structures enable the dispersant to be dissolved in a solvent and are conducive to dispersing other components in the slurry homogeneously, and increasing a solid content of the slurry, thereby improving stability of the slurry.

In some embodiments of the application, $R_1$, $R_2$, $R_3$, $R_4$, $R_5$, $R_6$, and $R_7$ are independently selected from hydrogen, halogen, cyano, substituted or unsubstituted $C_1$-$C_{15}$ alkyl, and substituted or unsubstituted $C_6$-$C_{12}$ aryl. Optionally, $R_3$, $R_2$, $R_3$, $R_4$, $R_5$, $R_6$, and $R_7$ are each independently at least one selected from hydrogen, halogen, cyano, methyl, ethyl, propyl, butyl, pentyl, n-hexyl, phenyl, and benzyl.

In these embodiments described above, the fact that $R_1$, $R_2$, $R_3$, $R_4$, $R_5$, $R_6$, and $R_7$ are each independently selected from the aforementioned groups allows the dispersant to contribute to homogeneous dispersion of components, such as an active material and a conductive agent, and further to improve electrical conductivity of the slurry, thereby reducing an electrical resistance of the electrode electrode containing the slurry.

In some embodiments of the present application, said first repeating structural unit has the following structural formula:

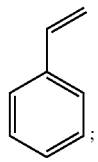

and
said second repeating structural unit is ethylene.

In these embodiments, the fact that the first repeating structural unit has the above structural formula and that the second repeating structural unit is ethylene may assist in dispersion of solid particles in the slurry.

In some embodiments of the present application, said first block is a random copolymerization block of said first repeating structural unit and said second repeating structural unit.

In such embodiments, the first block is a random copolymerization block of said first repeating structural unit and said second repeating structural unit, which enables the preparation of the dispersant to be easier.

In some embodiments of the present application, said first block has a weight average molecular weight in the range of 1000-500000.

In such embodiments, the weight average molecular weight of the first block is within the above range, which is conducive to dispersing solid particles in the slurry homogeneously, and increasing a solid content of the slurry.

In some embodiments of the present application, said second block has a weight average molecular weight in the range of 1000-500000.

In such embodiments, the weight average molecular weight of the second block is within the above range, which allows the dispersant to reduce occurrence of agglomeration of components in the slurry and to further contribute to uniform dispersion of components in the slurry.

In some embodiments of the present application, said first block and second block have a ratio of an average degree of polymerization in the range of (0.1-10):1.

In such embodiments, the average degree of polymerization of the first block and the second block is within the above range, which allows the dispersant to improve an dispersing effect of components in the slurry, and to further improve a solid content in the slurry, so as to make the slurry have better stability.

In a second aspect, embodiments of the present application provide a method of preparing a dispersant as described in any of the above embodiments, comprising:
  dissolving an initiator and a chain transfer agent in an organic solvent and stirring them under an inert atmosphere to obtain a mixed solution;
  adding monomers of a first block to said mixed solution for a first copolymerization reaction;
  after the first copolymerization reaction is complete, monomers of the second block are added for a second copolymerization reaction;
  after the second copolymerization reaction is complete, the resulting product is precipitated, filtered and dried to obtain said dispersant.

In the above embodiment, the preparation process is simple and safe. The dispersant as prepared is dissolved in a solvent, which helps uniform dispersion of other components in the slurry, and increases solid content of the slurry, thereby improving stability of the slurry.

In some embodiments of the present application, said stirring is carried out at rate in the range of 20 min/rpm-1500 min/rpm.

In such embodiments, the stirring rate in the above range may help an initiator and an chain transfer agent to be dissolved in an solvent, and facilitate the first copolymerization reaction and the second copolymerization reaction.

In some embodiments of the present application, the first copolymerization reaction is carried out at a reaction temperature in the range of −20° C. to 120° C.

In such embodiments, the reaction temperature of the first copolymerization reaction is within the above range, which can increase yield of the first copolymerization reaction.

In a third aspect, embodiments of the present application provide a slurry composition for forming an electrode film layer comprising the dispersant as described in any of the above embodiments as well as a binder, an active material, and optionally a conductive agent.

In such embodiments, the slurry composition has a high solid content because it contains the dispersant in the above embodiments, and thus the formed slurry has a good stability, thereby contributing to improving performances of batteries.

In some embodiments of the present application, said slurry composition comprises, relative to a total mass of the slurry composition, being 100%.
  0.01%-10% of the dispersant;
  0.5%-10% of a binder;
  82%-91.99% of an active material; and
  0%-15% of a conductive agent.

In such embodiments described above, a reasonable selection of the content of each component can further improve stability of the slurry.

In some embodiments of the present application, said active material is a positive electrode active material.

In such embodiments, the dispersant is able to be adsorbed faster on the surface of the positive electrode active material to make it uniformly dispersed, which can further improve performances of batteries.

In a fourth aspect, embodiments of the present application provide a method of preparing the slurry composition described in any of the above embodiments, comprising:
  mixing a conductive agent, the dispersant, and a portion of a solvent under a stirring condition to obtain a first mixture;
  adding a binder to said first mixture for mixing with stirring to obtain a second mixture;
  adding an active material and the remaining solvent to said second mixture for mixture with stirring to obtain said slurry composition.

In such embodiments above, efficiency of preparing the slue is improved by optimizing the order of addition of the components.

In a fifth aspect, embodiments of the present application provide an electrode plate comprising:
  a current collector;
  an active material layer, disposed on at least one surface of said current collector, said active material layer being formed using the slurry composition described in any of the above embodiments.

In such embodiments above, since the active material layer of the electrode plate is formed using the slurry compositions of the above embodiments, the electrode plate has a lower electrical resistance and is capable of improving cycle performances of batteries.

In a sixth aspect, embodiments of the present application provide a secondary battery comprising:
  a positive electrode plate;
  a negative electrode plate; and
  a separator, provided between said positive electrode plate and said negative electrode plate;
  wherein said positive electrode plate and/or said negative electrode plate are the electrode plate as described in the above embodiments.

In such embodiments above, since the positive electrode plate and/or the negative electrode plate are the electrode plate as described in the above embodiment, the battery has a better cycle performance.

In a seventh aspect, embodiments of the present application provide a battery module comprising the secondary battery as described in the above embodiments.

In such embodiments above, since the battery module comprises the secondary battery described in the above embodiment, it will have the technical effects described above for the secondary battery, which will not be repeated herein.

In an eighth aspect, embodiments of the present application provide a battery pack comprising the secondary battery described in the above embodiments or the battery module described in the above embodiments.

In such embodiments above, since the battery pack comprises the secondary battery or the battery module described in the above embodiments, it will have the technical effects described above for the secondary battery or the battery module, which will not be repeated herein.

In a ninth aspect, embodiments of the present application provide an electric device comprising the secondary battery as described in the above embodiments, the battery module as described in the above embodiments, or the battery pack as described in the above embodiments.

In such embodiment above, the electric device has a long service life and range since it comprises the secondary battery, the battery module, or the battery pack described in the above embodiment.

DESCRIPTION OF THE DRAWINGS

In order to explain the embodiments of the present application more clearly, the following will briefly introduce the drawings that need to be used in the embodiments of the present application. Apparently, the drawings described below are only some embodiments of the present application. A person skilled in the art can obtain other drawings based on the accompanying drawings without creative work.

Figure 1:
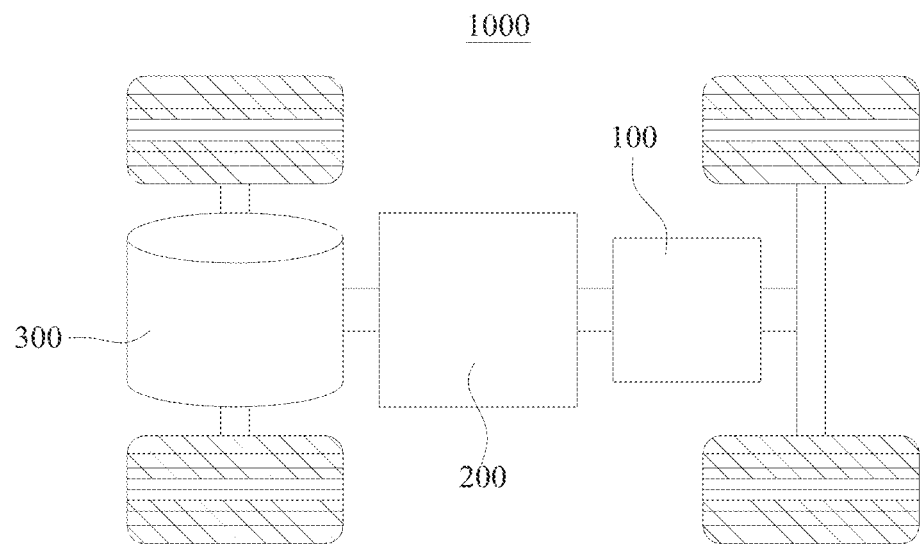
FIG. 1 is a schematic structural diagram of a vehicle according to some embodiments of the present application.

In the drawings, the accompanying drawings are not necessarily drawn to an actual scale.

The reference signs in the accompanying drawings are illustrated as follows:

vehicle 1000;
battery pack 100; controller 200; motor 300;
first box body 11; second box body 12;
battery module 20;
battery unit 30, housing 31, electrode assembly 32, and covering assembly 33.

DETAILED DESCRIPTION

The following describes in detail the embodiments of technical solutions In the present application with reference to the accompanying drawings. The following embodiments are merely used to describe technical solutions. In the present application more explicitly, and therefore they are merely used as examples and do not constitute a limitation on the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", and "having" and any other variations thereof in the specification, the claims, and the foregoing brief description of drawings of this application are intended to cover non-exclusive inclusions.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the symbol "/" in this specification generally indicates an "or" relationship between contextually associated objects.

In the description of embodiments of the present application, unless otherwise indicated, "above" and "below" are inclusive of the number itself, and "more" in "one or more" means two or more.

In the description of embodiments of the present application, the terms "a" and "the" refer to one or more molecules of a compound and are not limited to a single molecule of a compound. Furthermore, the one or more molecules may or may not be identical as long as they fall within the category of the chemical compound.

The grouping of alternative elements or embodiments disclosed herein should not be construed as limiting. Each group member may be adopted and claimed for protection individually, or in any combination with other members of the group or other elements found herein. It is foreseen that one or more members of a group may be included in or removed from the group for reasons of convenience and/or patentability. When any such inclusion or deletion occurs, the specification is hereby viewed as containing the group as altered and thus satisfying the written description of the entire Markush group used in the claims.

Various modifications and changes that can be made In the present application without departing from the scope of protection of this application will be apparent to those skilled in the art. Thus, the present application is intended to cover modifications and variations of the present application that fall within the scope of the corresponding claims (cope of protection claimed) and their equivalents. It should be noted that the embodiments provided by the examples of the present application may be combined with each other without contradiction.

Before elaborating on the scope of protection provided by the examples of the present application, in order to facilitate understanding of examples of the present application, the present application first provides a specific description of problems in the related technology.

Batteries are widely used in electric devices such as cellular phones, tablet computers, laptops, electric vehicles, and other electric devices because of their advantages of high energy density, rechargeability, and good cycle performance. With the development of battery technology, higher and higher requirements are placed on performance of batteries, such as cycle performance.

Stability of an electrode slurry is crucial to performances of batteries. Currently, a dispersant, such as polyvinyl alcohol, polyethylene glycol, etc., is usually added to the slurry to improve dispersing effect of solid components of the slurry in an organic solvent, so as to achieve the purpose of improving stability of the slurry. The inventors have found, upon study, that the above dispersant has a limited improvement in stability of the slurry, which results in its ineffectiveness in improving performances of batteries.

In view of this, the present application provides a dispersant and a preparation method thereof, a slurry composition and a preparation method thereof, an electrode plate, and an electric device containing the electrode plate and stability of the slurry may be improved.

In the present application, the electric device may be, but is not limited to, a mobile phone, a tablet, a laptop computer, an electric toy, an electric tool, an electric bicycle, an electric vehicle, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, an electric apparatus of an embodiment of the application being a vehicle 1000 is used as an example for description.

FIG. 1 is a schematic structural diagram of a vehicle according to some embodiments of the present application.

Referring to FIG. 1, the vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery pack 100 inside, where the battery pack 100 may be disposed in the bottom, front, or rear of the vehicle 1000. The battery pack 100 may be configured to supply power to the vehicle 1000. For example, the battery pack 100 may be used as an operational power source for the vehicle 1000. The vehicle 1000 may further include a controller 200 and a motor 300, where the controller 200 is configured to control the battery pack 100 to supply power to the motor 300, for example, to satisfy power needs of start, navigation, and driving of the vehicle 1000.

In some embodiments of the present application, the battery pack 100 can be used as not only the operational power source for the vehicle 1000 but also a driving power source for the vehicle 1000, replacing or partially replacing fossil fuel or natural gas to provide driving traction for the vehicle 1000.

Figure 2:
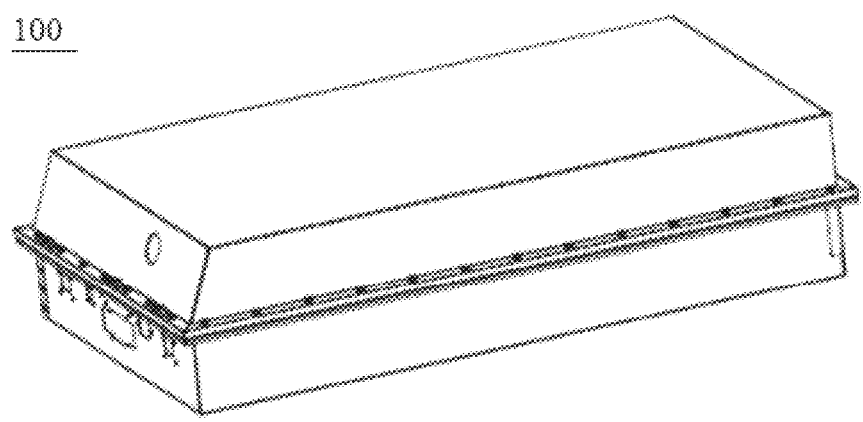
FIG. 2 is a schematic diagram of a battery pack according to some embodiments of the present application.
Figure 3:
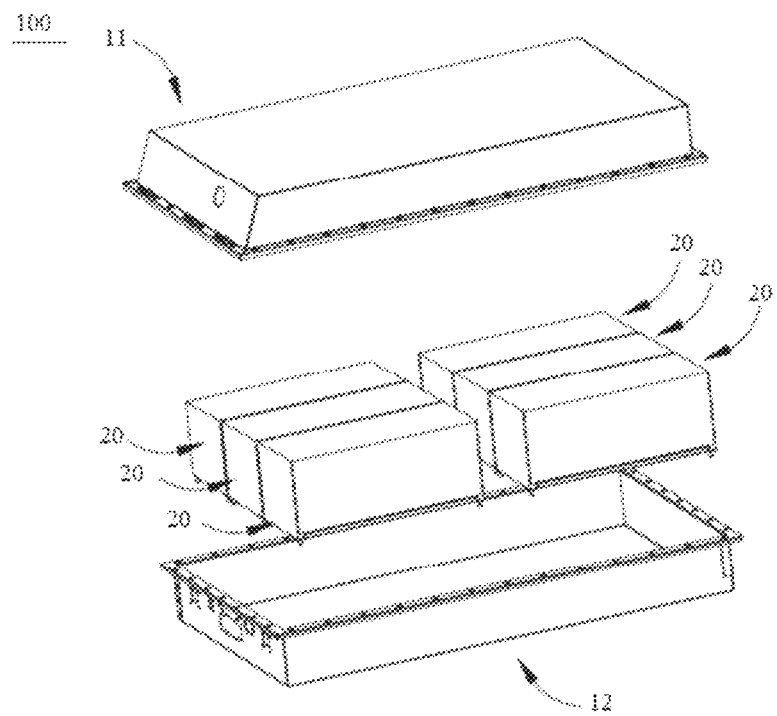
FIG. 3 is an exploded view of the battery pack as shown in FIG. 2.

FIG. 2 is a schematic diagram of a battery pack according to some embodiments of the present application. FIG. 3 is an exploded view of the battery pack as shown in FIG. 2.

Battery pack 100 of the present application means a battery pack 100 comprising at least one battery module 20 or at least one battery cell 30. As shown in FIG. 2 and FIG. 3, the battery pack 100 comprises a box and a battery module 20, where the battery module 20 is accommodated in the box.

The battery pack 100 comprises a box and a battery module 20, where the battery module 20 is accommodated in the box. The box is configured to provide an accommodating space for the battery module 20 and may be a variety of structures. In some embodiments, the box may include a first box body 11 and a second box body 12, where the first box body 11 and the second box body 12 cover each other and the first box body 11 and the second box body 12 fit together to jointly define space for accommodating the battery module 20. The second box body 12 may be a hollow structure with one end open, the first box body 11 may be a plate structure, and the first box body 11 covers an open side of the second box body 12, so that the first box body 11 and the second box body 12 jointly define an accommodating space. The first box body 11 and the second box body 12 may both be a hollow structure with one side open, and the open side of the first box body 11 covers the open side of the second box body 2112. Certainly, the box formed by the first box body 11 and the second box body 12 may be of a variety of shapes, for example, a cylinder or a cuboid.

In the battery pack 100, a plurality of battery modules 20 may be provided, and a plurality of battery modules 20 may be connected in series, parallel, or series-parallel, where being connected in series-parallel means a combination of series and parallel connections of a plurality of battery modules 20. A plurality of battery modules 20 may be directly connected in series, parallel or series-parallel, and then an entirety of a plurality of battery modules 20 is accommodated in the box.

Figure 4:
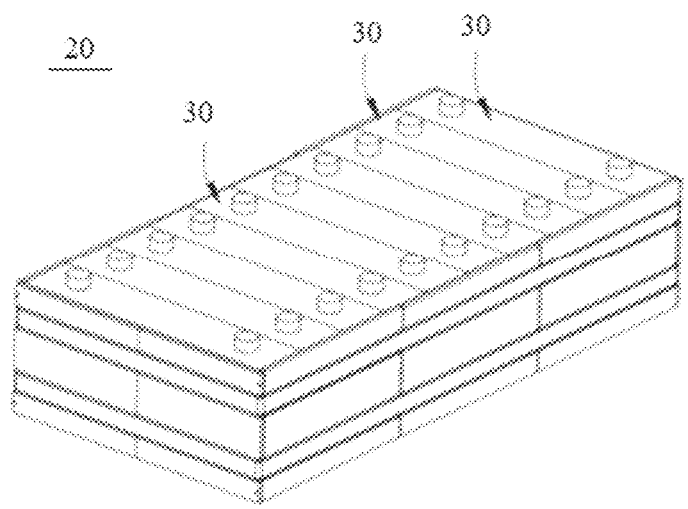
FIG. 4 is a schematic structural diagram of the battery module as shown in FIG. 3.

FIG. 4 a schematic structural diagram of the battery module as shown in FIG. 3.

The battery module 20 comprises one or more battery cells 30. For example, as shown in FIG. 4, the battery module 20 comprises a plurality of battery cells 30 and a plurality of battery cells 30 may be connected in series, parallel, or series-parallel, where being connected in series-parallel means a combination of series and parallel connections of the plurality of battery cells 30. A plurality of battery cells 30 may be directly connected in series, parallel or series-parallel.

Each battery cell 30 may be a secondary battery or a primary battery; alternatively, may be a lithium-ion battery, a sodium-ion battery, a magnesium-ion battery, or a potassium-ion battery, without being limited thereto. The battery cell 30 may be cylindrical, flat, cuboid, or of other shapes.

Figure 5:
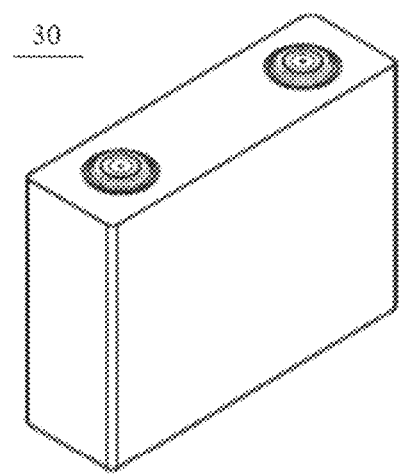
FIG. 5 is a schematic diagram of a battery cell according to some embodiments of the present application.
Figure 6:
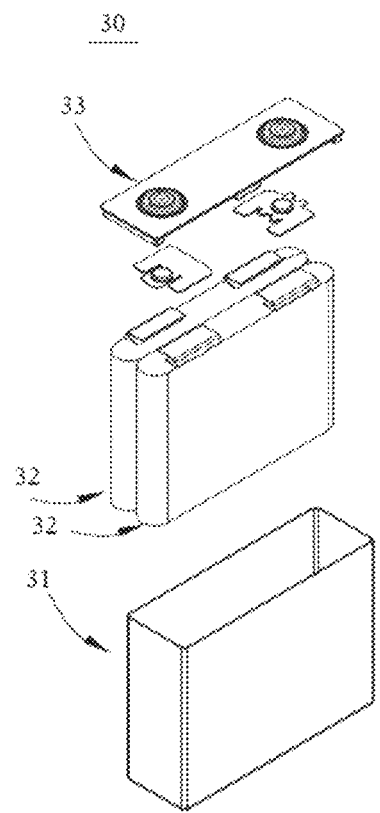
FIG. 6 is an exploded view of the battery cell as shown in FIG. 5.

FIG. 5 is a schematic diagram of a battery cell according to some embodiments of the present application. FIG. 6 is an exploded view of the battery cell as shown in FIG. 5.

As shown in FIG. 5, the battery cell 30 refers to a smallest independent unit constituting a battery. As shown in FIG. 6, the battery cell 30 comprises a housing 31, an electrode assembly 32, and a covering assembly 33. The housing 31 has a chamber for accommodating the electrode assembly 32, and the covering assembly 33 is used to close an opening of the housing 31. The covering assembly 33 includes an end cover, and the end cover is connected to the housing 31 to form an outer housing for the battery cell 30, the electrode assembly 32 is disposed within the housing 31, and the housing 31 is filled with an electrolyte.

The end cover refers to a component that covers an opening of the housing 31 to isolate an internal environment of the battery cell 30 from an external environment thereof. Without limitation, a shape of the end cover may fit with a shape of the housing 31. Optionally, the end cover may be made of a material with specified hardness and strength (for example, aluminum alloy), so that the end cover is less likely to deform under extrusion and collision, enabling the battery cell 30 to have a higher structural strength and enhanced safety performance. The end cover may be provided with functional components such as an electrode terminal. The electrode terminal may be configured to be electrically connected to the electrode assembly 32 for outputting or inputting electric energy of the battery cell 30. In some embodiments, the end cover may also be provided with a pressure relief mechanism configured to relieve internal pressure when the internal pressure or temperature in the battery cell 30 reaches a threshold. The end cover may also be made of various materials, such as copper, iron, aluminum, stainless steel, aluminum alloy, and plastic, which are not particularly limited in the embodiments of this application. In some embodiments, an insulator may also be disposed on an inner side of the end cover. The insulator can be configured to isolate electrical connection parts in the housing 31 from the end cover, reducing a risk of short circuit. For example, the insulator may be made of plastic, rubber, or the like.

The housing 31 is a component configured to form the internal environment of the battery cell 30 together with the end cover, where the internal environment formed may be used to contain the electrode assembly 32, electrolyte, and other components. The housing 31 and the end cover may be separate components, an opening may be provided in the housing 31, and the end cover covers the opening to form the internal environment of the battery cell 30. Without limitation, the end cover and the housing 31 may also be integrated. Specifically, the end cover and the housing 31 may form a shared connection surface before other components are disposed inside the housing 31, and then the end cover covers the housing 31 when inside of the housing 31 needs to be enclosed. The housing 31 may be of various shapes and sizes, such as a cuboid shape, a cylindrical shape, and a hexagonal prism shape.

The electrode assembly 32 is a component in which electrochemical reactions take place in the battery cell 30. There may be one or more electrode assemblies 32 in the housing. The electrode assembly 32 is mainly formed by winding or stacking a positive electrode plate and a negative electrode plate, and a separator is generally disposed between the positive electrode plate and the negative electrode plate. Parts of the positive electrode plate and the negative electrode plate with active substances constitute a body portion of the electrode assembly 32, while parts of the positive electrode plate and the negative electrode plate without active substances separately constitute a tab. A positive tab and a negative tab may both be located at one end of the body portion or be located at two ends of the body portion respectively. During charge and discharge of the battery, a positive electrode active substance and a negative electrode active substance react with an electrolyte, and the tabs are connected to electrode terminals to form a current loop.

Dispersant for Secondary Batteries

Embodiments of the present application provide a dispersant comprising a block copolymer having a first block and a second block wherein said first block comprises a first repeating structural unit shown in Formula I) and a second repeating structural unit shown in Formula II):

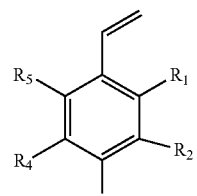

(I)

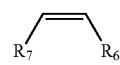

(II)

wherein $R_1$, $R_2$, $R_3$, $R_4$, $R_5$, $R_6$, and $R_7$ are independently selected from hydrogen, halogen, cyano, carbonyl, carboxy, nitro, sulfonyl, amide, ester, substituted or unsubstituted $C_1$-$C_{15}$ alkyl, substituted or unsubstituted $C_1$-$C_{15}$ alkoxy, and substituted or unsubstituted $C_6$-$C_{30}$ aryl;

said second block comprises a third repeating structural unit shown in Formula III) and a fourth repeating structural unit shown in Formula IV):

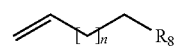

(III)

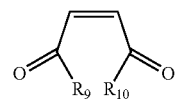

(IV)

wherein n represents an average degree of polymerization, that is any integer from 1-25 and $R_8$, $R_9$, and $R_{10}$ have a dipole moment of greater than $2\times10^{-30}$ C·m.

In the present application, halogen refers to fluorine, chlorine, bromine or iodine.

In the present application, when a compound or chemical structural feature (e.g., alkyl, aryl) is said to be "substituted," the feature may have one or more substituents. The term "substituent" has the broadest meaning known to one of ordinary skill in the art and includes such a moiety that occupies a position normally occupied by one or more hydrogen atoms attached to a parent compound or chemical structure feature.

In the preset application, the term "C1-C15 alkyl" refers to straight or branched alkyl groups having a carbon number of 1 to 15, examples of which include, but are not limited to, methyl, ethyl, n-propyl, iso-propyl, n-butyl, sec-butyl, iso-butyl, tert-butyl, n-pentyl, 1-methylbutyl, 2-methylbutyl, iso-pentyl, 1-ethylpropyl, 1,1-dimethylpropyl, 1,2-dimethylpropyl, neopentyl, n-hexyl, 1-methylpentyl, 2-methylpentyl, 3-methylpentyl, isohexyl, 1-ethylbutyl, 2-ethylbutyl, 1,1-dimethylbutyl, 1,2-dimethylbutyl, 1,3-dimethylbutyl, 2,2-dimethylbutyl, 2,3-dimethylbutyl, dimethylbutyl, 1,1,2-trimethylpropyl, 1,2,2-trimethylpropyl, or 1-ethyl-1-methylpropyl groups.

In the present application, the term "C6-C30 aryl" refers to a closed aromatic ring or ring system having a carbon number of 6 to 30, Examples of aryl groups include, but are not limited to, phenyl, naphthyl, phenanthryl, anthracenyl, biphenyl (including dibenzyl, triphenyl), triphenylene, pyrenyl, spirobifluorenyl, chrysenyl, perylenyl, indenyl, azulenyl, and benzophenanthryl.

In the present application, the term "spatial hindrance group" refers to any functional group capable of causing mutual repulsion in spatial arrangement. Such spatial hindrance groups include, but are not limited to, hydroxyl, alkoxy, cycloalkoxy.

In the present application, the term "C1-C15 alkoxy" refers to a straight or brandied C1-C15 alkyl group, or a cycloalkyl group having a carbon number of 1 to 15, wherein one or more oxygen atoms are present between two carbon atoms in each case. Alkoxyl group includes, but not limited to, methoxy, ethoxy, propoxy, isopropoxy, butoxy, isobutoxy, sec-butoxy, tert-butoxy, pentyloxy, hexyloxy, heptyloxy, octyloxy, nonyloxy, decyloxy, undecyloxy, dodecyloxy, tridecyloxy, tetradecyloxy, pentadecyloxy, ethylene epoxide, propylene epoxide, hexylene epoxide, octylene epoxide.

In the above embodiments, the dispersant is a block copolymer having a first block and a second block, wherein the first block comprises a first repeating structural unit shown in Formula I) and a second repeating structural unit shown in Formula II), and the second block comprises a third repeating structural unit shown in Formula III) and a fourth repeating structural unit shown in Formula IV), and the above mentioned structures enable the dispersant to be dissolved in a solvent and are conducive to dispersing other components in the slurry homogeneously, and increasing a solid content of the slurry, thereby improving stability of the slurry.

In some embodiments of the application, $R_1$, $R_2$, $R_3$, $R_4$, $R_5$, $R_6$, and $R_7$ are independently selected from hydrogen, halogen, cyano, substituted or unsubstituted C1-C12 alkyl, substituted or unsubstituted $C_6$-$C_{12}$ aryl.

In these embodiments described above, the fact that $R_1$, $R_2$, $R_3$, $R_4$, $R_5$, $R_6$, and $R_7$ are each independently selected from the aforementioned groups allows the dispersant to be dissolved in an organic solvent quickly and to be adsorbed on the surface of solid particles in the slurry so as to contribute to homogeneous dispersion of solid particles, and further to increase solid content of the slurry. Moreover, uniform dispersion of components in the slurry may improve electrical conductivity of the slurry, thereby reducing an electrical resistance of the electrode electrode containing the slurry.

In some embodiments of the application, $R_1$, $R_2$, $R_3$, $R_4$, $R_5$, $R_6$, and $R_7$ are each independently at least one selected from hydrogen, halogen, cyano, methyl, ethyl, propyl, butyl, pentyl, n-hexyl, phenyl, and benzyl.

In the above embodiments, $R_1$, $R_2$, $R_3$, $R_4$, $R_5$, $R_6$, and $R_7$ are each independently at least one selected from hydrogen, halogen, cyano, methyl, ethyl, propyl, butyl, pentyl, n-hexyl, phenyl, and benzyl, which is conducive to further increasing solid content of slurry and reducing electrical resistance of the electrode electrode containing the slurry.

In some embodiments of the present application, when $R_1$, $R_2$, $R_3$, $R_4$ and $R_5$ all are hydrogen, the first repeating structural unit has the following structural formula:

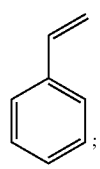

(V)

and when $R_6$ and $R_7$ both are hydrogen, the second repeating structural unit is ethylene.

In the above embodiments, the fact that the first repealing structural unit has the above structural formula and that the second repeating structural unit is ethylene may help the dispersant firmly adsorbed on the surface of solid particles in the slurry, so that solid particles are evenly dispersed.

In some embodiments of the present application, said first block is a random copolymerization block of said first repeating structural unit and said second repeating structural unit.

In the above embodiments, the first block is a random copolymerization block of said first repeating structural unit and said second repeating structural unit, which enables the preparation of the dispersant to be easier.

In some embodiments of the present application, the first block has a weight average molecular weight in the range of 1000-500000.

In the above embodiments, the weight average molecular weight of the first block is within the above range, which is conducive to dispersing solid particles in the slurry homogeneously, and increasing a solid content of the slurry.

As an example, the first block may have a weight average molecular weight of 1000, 2000, 3000, 4000, 5000, 6000, 7000, 8000, 9000 or more.

In embodiments of the present application, the second block comprises a third repeating structural unit shown in Formula III) and a fourth repeating structural unit shown in Formula IV), wherein the third repeating structural unit shown in Formula III), as a spatial hindrance group can randomly copolymerize with the fourth repeating structural unit shown in Formula IV) to form a random copolymerization block, which can enable the dispersant molecules to have a larger spatial hindrance each other and reduce occurrence of agglomeration of components in the slurry.

In some embodiments of the present application, $R_8$ is selected from hydroxyl, carboxyl, pyrrolidone, ethylene oxide, propylene oxide, halogen, substituted or unsubstituted C1-C15 alkyl, and substituted or unsubstituted C1-C15 alkoxy.

In the above embodiments, $R_8$ is selected from the aforementioned groups, which can enable the dispersant molecules to have a larger spatial hindrance each other and reduce occurrence of agglomeration of components in the slurry.

In some embodiments of the present application, $R_9$ and $R_{10}$ are independently selected front hydroxyl, carboxyl, pyrrolidone, ethylene oxide, propylene oxide, halogen, substituted or unsubstituted C1-C15 alkyl, and substituted or unsubstituted C1-C15 alkoxy, wherein $R_9$ and $R_{10}$ may be joined together as R9-O—R10 or R9-NH—R10.

In the above embodiments, $R_9$ and $R_{10}$ are selected from the aforementioned groups, which enables the dispersant to have a large spatial hindrance between its molecules and further enables the dispersant to contribute to improving dispersion effect of components in the slurry.

In some embodiments of the present application, said second block has a weight average molecular weight in the range of 1000-500000.

In the above embodiments, the weight average molecular weight of the second block is within the above range, which allows the dispersant to reduce occurrence of agglomeration of components in the slurry and to further contribute to uniform dispersion of components in the slurry.

As an example, the second block may have a weight average molecular weight of 1000, 2000, 3000, 4000, 5000, 6000, 7000, 8000, 9000 or more.

In some embodiments of the present application, said first block and second block have an average degree of polymerization ratio in the range of (0.1-10):1.

In the above embodiments, the average degree of polymerization of the first block and the second block is within the above range, which allows the dispersant to improve dispersion effect of components in the slurry, and to further improve a solid content of the slurry, so as to make the slurry have better stability.

Preparation of Dispersant

Embodiments of the present application provide a method of preparing a dispersant as described in any of the above embodiments, comprising:

S10: dissolving an initiator and a chain transfer agent in an organic solvent and stirring them under an inert atmosphere to obtain a mixed solution;

S20: adding monomers of a first block to said mixed solution for a first copolymerization reaction;

S30: after the first copolymerization reaction is complete, adding monomers of the second block for a second copolymerization reaction;

S40: after the second copolymerization reaction is complete, the resulting product is precipitated, filtered and dried to obtain said dispersant.

In the above embodiment, the preparation process is simple and sale. The dispersant as prepared is dissolved in a solvent, which helps uniform dispersion of other components in the slurry, and increases solid content of the slurry, thereby improving stability of the slurry.

In some embodiments of the present application, said stirring in the step of S10 is carried out at rate in the range of 20 min/rpm-1500 mm/rpm.

In the above embodiments, the stirring rate in the above range may help an initiator and an chain transfer agent to be dissolved in an solvent, and facilitate the first copolymerization reaction and the second copolymerization reaction.

In some embodiments of the present application, the first copolymerization reaction in the step of S20 is carried out at a reaction temperature in the range of −20° C. to 120° C.

In the above embodiments, the reaction temperature of the first copolymerization reaction is within the above range, which can increase yield of the first copolymerization reaction.

In some embodiments of the present application, the initiator may be any one or more initiators used in a copolymerization reaction, such as an azo compound. As an example, the initiator may be, but not limited to, azobisisobutyronitrile (referred to as AIBN).

In some embodiments of the present application, the chain transfer agent may be any one or more chain transfer agents for use in a copolymerization reaction, which is not specifically limited in the embodiments of the present application. As an example, the chain transfer agent may have the structural formula of Formula VI):

$$\text{OH} - \overset{\text{O}}{\underset{}{\text{C}}} - \overset{}{\underset{\text{S}}{\text{CH}}} - \overset{\text{S}}{\underset{}{\text{C}}} - \text{S} - R_{11} \quad (\text{VI})$$

wherein $R_{11}$ is selected from C1-C5

Slurry Composition for Forming an Electrode Film Layer

Embodiments of the present application provide a slurry composition for forming an electrode film layer comprising the dispersant as described in any of the above embodiments as well as a binder, an active material, and optionally a conductive agent.

In the above embodiments, the slurry composition has a high solid content because it contains the dispersant in the above embodiments, and thus the formed slurry has a good stability, thereby contributing to improving performances of batteries.

In some embodiments of the present application, the binder may include, but not limited to, at least one of sodium polyacrylate, polyacrylamide, polyacrylic acid, polyacrylate, polyacrylonitrile, styrene butadiene rubber, polytetrafluoroethylene, polyvinylidene fluoride, and polyvinyl alcohol.

In some embodiments of the present application, the conductive agent may include, but not limited to, at least one of superconducting carbon, acetylene black, carbon black, Ketjen black, carbon dots, carbon nanotubes, graphene, and carbon nanofibers.

In some embodiments of the present application, said slurry composition comprises, relative to a total mass of the slurry composition, being 100%.

0.01%40% of the dispersant;
0.5%-10% of a binder;
82%-91.99% of an active material; and
0%-15% of a conductive agent.

In the above embodiments, a reasonable selection of the content of each component can further improve stability of the slurry.

In some embodiments of the present application, said active material is a positive electrode active material and the positive electrode active material may be any one or more positive electrode active materials for batteries.

An example, the positive active material may include at least one of lithium-containing phosphates with an olivine structure, lithium transition metal oxides and their respective modified compounds. However, the present application is not limited to these materials, and other traditional materials that can be used as positive battery active materials may also be used. These positive active materials can be used alone, or in a combination of more than two materials. Examples of lithium transition metal oxides may include, but not limited to, at least one of lithium cobalt oxides (e.g., $LiCoO_2$), lithium nickel oxides (e.g., $LiNiO_2$), lithium manganese oxides (e.g., $LiMnO_2$, $LiMn_2O_4$), lithium nickel cobalt oxide, lithium manganese cobalt oxide, lithium nickel manganese oxide, lithium nickel cobalt manganese oxide (e.g., $LiNi_{1/3}Co_{1/3}Mn_{1/3}O_2$ (also be abbreviated as NCM333), $LiNi_{0.5}Co_{0.2}Mn_{0.3}O_2$ (also referred to as NCM523), $LiNi_{0.5}Co_{0.25}Mn_{0.25}O_2$ (also referred to as NCM211), $LiNi_{0.6}Co_{0.2}Mn_{0.2}O_2$ (also referred to as NCM622), $LiNi_{0.8}Co_{0.1}Mn_{0.1}O_2$ (also referred to as NCM811), lithium nickel cobalt aluminum oxide (e.g., $LiNi_{0.85}Co_{0.15}Al_{0.05}O_2$), and modified compounds thereof, and the like. Examples of lithium-containing phosphates with an olivine structure may include, but are not limited to, at least one of lithium iron phosphate (e.g., $LiFePO_4$ (also be abbreviated as LFP)), a composite of lithium iron phosphate and carbon, lithium manganese phosphate (e.g., $LiMnPO_4$), a composite of lithium manganese phosphate and carbon, lithium iron manganese phosphate, and a composite of lithium iron manganese phosphate and carbon.

In some embodiments of the present application, said active material is a negative electrode active material and the negative electrode active material may be any one or more negative electrode active materials for batteries.

By way of example, the negative electrode active material may include at least one of artificial graphite, natural graphite, soft carbon, hard carbon, silicon-based material, tin-based material, and lithium titanate. Said silicon-based materials may include at least one of elemental silicon, silicon-oxygen compounds, silicon-carbon composites, silicon-nitrogen composites, and a silicon alloy material. Said tin-based materials may include at least one of elemental tin, a tin oxide, and a tin alloy material. The present application is not limited to these materials, and other conventionally known materials that can be used as negative electrode active materials for secondary batteries may also be used. These negative electrode active materials can be used alone, or in combination of two or more materials.

In the above embodiments, the dispersant is able to be adsorbed faster on the surface of the positive electrode active material to make it uniformly dispersed, which can further improve performances of batteries.

Preparation of Slurry Composition

Embodiments of the present application provide a method of preparing the slurry composition, comprising:
- S50: mixing a conductive agent, the dispersant, and a portion of a solvent under a stirring condition to obtain a first mixture;
- S60: adding a binder to said first mixture for mixing with stirring to obtain a second mixture;
- S70: adding an active material and the remaining solvent to said second mixture for mixture with stirring to obtain said slurry composition.

In the above embodiments, efficiency for preparing the slurry is improved by optimizing the addition order of components.

In embodiments of the present application, the stirring line speed and stirring time of the slurry can be reduced due to use of the dispersant according to the above embodiments. In some embodiments of the present application, the stirring line speed in step S50 is 2 m/s-10 m/s, and the stirring time is 5 min-40 min; the stirring line speed in step S60 is 2 m/s-10 m/s, and the stirring time is 5 min-40 min; and the stirring line speed in step S70 is 2 m/s-10 m/s, and the stirring time is 150 min-220 min, Electrode Plate Embodiments of the present application provide an electrode plate comprising a current collector and an active material layer, wherein the active material layer is disposed on at least one surface of the current collector, and wherein the active material layer is formed from the slurry composition in any of the above embodiments.

In the above embodiments, since the active material layer of the electrode plate is formed from the slurry composition of the above embodiments, the electrode plate has a lower electrical resistance and is capable of improving cycle performance of batteries.

In some embodiments of the present application, the current collector may be a metal foil or a composite collector. For example, as a metal foil, an aluminum foil may be used. The composite current collector may include a polymeric material base layer and a metal layer formed on at least one surface of the polymeric material base layer. The composite current collector may be formed by forming a metallic material (aluminum, aluminum alloys, nickel, nickel alloys, titanium, titanium alloys, silver and silver alloys, and the like) on a polymeric material substrate, such as a substrate of polypropylene (PP), polyethylene terephthalate (PET), polybutylene terephthalate (PBT), polystyrene (PS), polyethylene (PE), and the like, Secondary Battery Embodiments of the present application provide a secondary battery including a positive plate, a negative plate, and a separator. The separator is disposed between the positive plate and the negative plate. The positive plate and/or the negative plate are the electrode plate in the above embodiments.

In the above embodiments, since the positive electrode plate and/or the negative electrode plate are the electrode plate in the above embodiments, the battery has a better cycle performance.

In some embodiments of the present application, where the positive plate is the electrode plate in the above embodiments, the active material layer is a positive active material layer. The positive electrode plate can be prepared by: applying the positive electrode slurry composition described above to at least one surface of the positive electrode current collector, drying, cold pressing, and obtaining the positive electrode plate.

In some embodiments of the present application, the negative electrode plate is the electrode plate in the above embodiments, and then the active material layer is a negative electrode active material layer. The negative electrode plate can be prepared by: applying the negative electrode slurry composition described above to at least one surface of the negative electrode collector, drying, cold pressing, and obtaining the negative electrode plate.

There is no particular limitation to the type of separator in the present application, and any one or more porous structure separators having good chemical stability and mechanical stability may be used.

In some embodiments of the present application, the separator may be made of at least one materials selected from glass fiber, nonwoven fabric, polyethylene, polypropylene, and polyvinylidene fluoride. The separator may be a single-layer film or a multilayer composite film, without particular limitation. Where the separator is a multilayer composite film, materials for each layers may be the same or different without particular limitation.

In embodiments of the present application, an electrolyte is also included, which serves to conduct ions between the positive electrode plate and the negative electrode plate. The present application has no specific limitation to the type of electrolyte, which may be selected according to needs. For example, the electrolyte may be liquid, gel, or all-solid.

In some embodiments of the present application, the electrolyte is in a liquid state and comprises an electrolyte salt and a solvent.

In some embodiments of the present application, the electrolyte salt may be at least one selected from lithium hexafluorophosphate, lithium tetrafluoroborate, lithium perchlorate, lithium hexafluoroarsenate, lithium bisfluorosulfonimide, lithium bis(trifluoromethane sulfonimide), lithium trifluoromethane sulfonate, lithium difluorophosphate, lithium difluorooxalate borate, lithium dioxalate borate, lithium difluorodioxalate phosphate and lithium tetrafluorooxalate phosphate.

In some embodiments of the present application, the solvent may be at least one selected from ethylene carbonate, propylene carbonate, ethyl methyl carbonate, diethyl carbonate, dimethyl carbonate, dipropyl carbonate, methyl propyl carbonate, ethyl propyl carbonate, huh lone carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone and diethyl sulfone.

In some embodiments of the present application, the electrolytic solution may further optionally include additives. For example, the additives may include negative electrode film-forming additives, positive electrode film-forming additives, and additives that can improve certain performances of batteries, for example, additives that improve overcharge performance of batteries, additives that improve high-temperature performance of batteries, and additives that improve low-temperature performance of batteries.

An electrode assembly may be formed by stacking the above positive electrode plate, separator, and negative electrode plate in order, so that the separator serves as isolation between the positive electrode plate and the negative electrode plate, alternatively the electrode assembly can be obtained by winding. The electrode assembly is connected with tabs and then the elected assembly is placed into a packaging shell and heated to remove excess water and then an electrolyte is injected into it and then the electrode assembly is sealed. Finally, it is subjected to resting, hot and cold pressing, chemical formation, shaping, capacity testing and other processes to obtain the secondary battery of the present application.

Battery Module

Embodiments of the present application provide a battery module including the secondary battery in the above embodiments. Since the secondary battery in the above embodiment is included, the battery module also has the technical effects that the secondary battery in the above embodiment has, which are not described herein.

Battery Pack

Embodiments of the present application provide a battery pack including the secondary battery in the above embodiments or the battery module in the above embodiments. Since the secondary battery or the battery module in the above embodiments is included, the battery pack also has the technical effects described above for the secondary battery or the battery module, which are not described herein.

Electric Device

Embodiments of the present application provide an electric device comprising the secondary battery in the above embodiments, the battery module in the above embodiments, or the battery pack in the above embodiments. Since the secondary battery, the battery module or the battery pack in the above embodiment is included, the electric device has a long service life and range.

The dispersant and its preparation method, the slurry composition and secondary battery are described in detail below by way of specific examples.

Example 1

Preparation of Dispersant the dispersant was prepared by the specific steps of:
(1) dissolving 0.025 mol of AIBN and 0.05 mol of an RAFT agent in 300 mL of dioxane under nitrogen atmosphere with stirring for 1 h to obtain a mixed solution;
(2) adding 0.25 mol styrene and 025 mol ethylene to the mixed solution to carry out a first copolymerization reaction at a reaction temperature of 60° C. for a reaction time of 6 h;
(3) after the first copolymerization reaction is complete, performing a second copolymerization reaction of 0.25 mol maleic anhydride and 0.25 mol of a compound having formula III) ($R_8$ is ethylene oxide and, n=12) for 6 h;
(4) after the second copolymerization reaction is complete, the resulting product was precipitated, filtered and dried to obtain a dispersant having the following structural formula.

Preparation of Positive Electrode Plate

The positive electrode plate was prepared by the specific steps as follows.
(1) Carbon nanotubes, the dispersant, and a portion of N-methylpyrrolidone as a solvent (about 90% of the total weight of the solvent) were mixed under stirring to obtain a first mixture, wherein the stirring line speed was 3 m/s and the stirring time was 5 min;
(2) PVDF was mixed with the first mixture under stirring to obtain a second mixture, wherein the stirring linear speed was 4 m/s and the stirring time was 5 min,
(3) Lithium iron phosphate and the remaining amount of N-methylpyrrolidone as solvent were added to the second mixture with stirring for mixing to obtain a positive electrode slurry, wherein the stirring line speed was 5 m/s and the stirring time was 170 min,
(4) The positive electrode slurry was applied to the surface of the aluminum foil, and then the positive electrode plate was obtained after it was subjected to drying and cold pressing;
wherein the weight ratio of the above lithium iron phosphate, carbon nanotubes, PVDF and dispersant is 91.9:5:3:0.1.

Preparation of Negative Electrode Plate

The negative electrode plate was prepared by the specific steps as follows.
(1) A negative electrode slurry was obtained by mixing artificial graphite/silicon oxide, Super P, and polyvinylidene tetrafluoroethylene (referred to as PVDF) at a weight ratio of 96:2:2 in a deionized water as a solvent with thorough stirring and mixing;
(2) the negative electrode slurry was applied to a copper foil, and the negative electrode plate was obtained after it was subjected to drying and cold pressing.

Preparation of Electrolyte

In an argon atmosphere glove box ($H_2O<0.1$ ppm, $O_2<0.1$ ppm), ethylene carbonate (referred to as EC) and ethyl methyl carbonate (referred to as EMC) were mixed homogeneously at a volume ratio of 3:7 to obtain an organic solvent, and then 12.5% lithium hexafluorophosphate (referred to as $LiPF_6$) was added to be dissolved in the above-mentioned organic solvent, and stirred homogeneously, thereby obtaining the electrolyte.

Separator

A polyethylene film was used as a separator.

Preparation of Secondary Battery

An electrode assembly was formed by stacking the above positive electrode plate, separator, and negative electrode plate in order, so that the separator served as isolation between the positive electrode plate and the negative electrode plate, and then the laminate was wound, thereby obtaining an electrode assembly. The electrode assembly was welded with tabs and then the electrode assembly was placed into an aluminum shell and was subjected to baking at 80° C. to remove water. An electrolyte was injected into it and then the electrode assembly was sealed. Finally, it was subjected to resting, hot and cold pressing, chemical formation, shaping, and other processes to obtain the secondary battery of the present application.

Examples 2-26 and Comparative Example 1

The secondary batteries of Examples 2-26 and Comparative Example 1 were prepared in a method similar to that of Example 1, with the difference as listed in Table 1. In Example 17, the first repeating structural unit has the structural formula of Formula (A), the second repeating structural unit has the structural formula of Formula (B), and the fourth repeating structural unit has the structural formula of Formula (C).

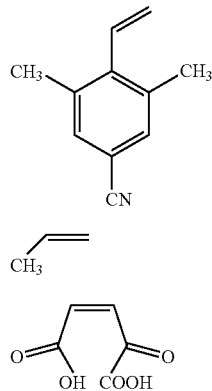

In Example 18, the first repeating structural unit has the structural formula of Formula (D), the second repeating structural unit has the structural formula of Formula (E), and the fourth repeating structural unit has the structural formula of Formula (F).

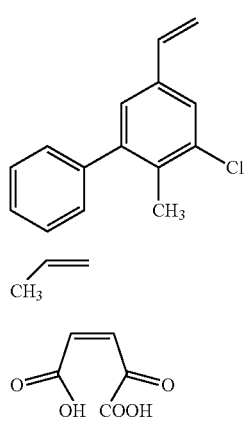

In Example 19, the first repeating structural unit has the structural formula of Formula (H), the second repeating structural unit has the structural formula of Formula (NI), and the fourth repeating structural unit has the structural formula of Formula (G).

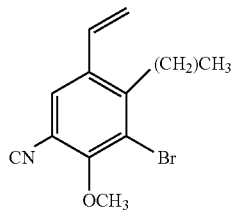

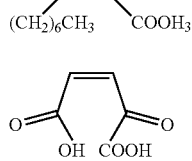

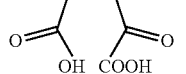

Test of Solid Content of Positive Electrode Slurry

The positive electrode slurry was applied to an aluminum foil and dried to obtain a positive electrode plate. Therein, the solid content W of the positive electrode slurry was calculated by the following formula:

$$W=(m1-m0)/(m2-m0)\times 100\%$$

wherein m0 is the mass of the aluminum foil, m1 is the mass of the dried positive electrode plate, and m2 is the mass of the wet positive electrode plate obtained after the positive electrode slurry was applied to the aluminum foil.

Test of Resistivity of Positive Electrode Plate

The resistivity of the electrode plate was tested directly using a JinkoSolar Model ST2263 Dual Electro-Measurement Digital Four-Probe Tester.

Test of Battery Capacity Retention

In an environment of 25° C., a secondary battery was charged to 3.65V at a constant current of 1C. and then discharged to 2.5V at a constant discharge current of 0.5C. The measured discharged capacity was recorded as an initial capacity C0. The above steps were repeated for the same battery, and the discharged capacity of the battery after it was subjected to above process n times of cycles was recorded. The capacity retention of the battery after it was subjected to above process n times of cycles was recorded as Pn=100%×Cn/C0, where the first cycle corresponds to n=1, the second cycle corresponds to n=2 . . . the 100th cycle corresponds to n=100. The battery capacity retention after 1000 cycles was determined and the test results were shown in Table 1.

TABLE 1

| No. | Dispersant | Addition amount of dispersant | Molecular weight/$10^4$ | Ratio of average polymerization degree of first block to second block | Stirring line speed/ (m/s) | $T_{total}$/ min | W/% | Z/$10^2$ $\Omega \cdot cm$ | K |
|---|---|---|---|---|---|---|---|---|---|
| Example 1 | Dispersant 1 | 0.10% | 0.28 | 1:1 | 2.00 | 180 | 65 | 0.9 | 90% |
| Example 2 | Dispersant 2 | 6.00% | 0.1 | 5:1 | 7.56 | 199 | 65.05 | 0.99 | 91% |
| Example 3 | Dispersant 3 | 6.00% | 1 | 5:1 | 5.43 | 173 | 65.80 | 0.33 | 92% |
| Example 4 | Dispersant 4 | 6.00% | 4 | 5:1 | 3.20 | 205 | 65.13 | 0.71 | 91% |
| Example 5 | Dispersant 5 | 6.00% | 16 | 5:1 | 5.67 | 164 | 64.40 | 0.99 | 92% |
| Example 6 | Dispersant 6 | 6.00% | 25 | 5:1 | 7.67 | 217 | 65.71 | 0.72 | 91% |
| Example 7 | Dispersant 7 | 6.00% | 34 | 5:1 | 4.69 | 204 | 64.57 | 0.04 | 91% |
| Example 8 | Dispersant 8 | 6.00% | 42 | 5:1 | 5.86 | 203 | 65.11 | 0.27 | 91% |
| Example 9 | Dispersant 9 | 6.00% | 50 | 5:1 | 3.52 | 172 | 64.08 | 0.05 | 90% |
| Example 10 | Dispersant 10 | 6.00% | 52 | 5:1 | 5.80 | 217 | 65.80 | 0.58 | 91% |
| Example 11 | Dispersant 11 | 0.01% | 20 | 5:1 | 3.29 | 212 | 65.19 | 0.06 | 90% |
| Example 12 | Dispersant 12 | 0.02% | 20 | 5:1 | 5.77 | 179 | 64.76 | 0.07 | 92% |
| Example 13 | Dispersant 13 | 0.60% | 20 | 5:1 | 6.89 | 195 | 64.07 | 0.35 | 92% |
| Example 14 | Dispersant 14 | 2.00% | 20 | 5:1 | 7.99 | 205 | 64.17 | 0.00 | 92% |
| Example 15 | Dispersant 15 | 8.00% | 20 | 5:1 | 6.36 | 198 | 64.95 | 0.95 | 91% |
| Example 16 | Dispersant 16 | 10.00% | 20 | 5:1 | 5.31 | 178 | 65.23 | 0.52 | 91% |
| Example 17 | Dispersant 17 | 11.00% | 20 | 5:1 | 2.89 | 197 | 65.16 | 0.04 | 91% |
| Example 18 | Dispersant 18 | 6.00% | 20 | 5:1 | 3.92 | 202 | 64.38 | 0.61 | 92% |
| Example 19 | Dispersant 19 | 6.00% | 20 | 5:1 | 4.79 | 170 | 64.21 | 0.99 | 91% |
| Example 20 | Dispersant 20 | 6.00% | 20 | 11:1 | 4.65 | 196 | 65.97 | 0.78 | 91% |
| Example 21 | Dispersant 21 | 6.00% | 20 | 10:1 | 2.29 | 209 | 65.39 | 0.75 | 90% |
| Example 22 | Dispersant 22 | 6.00% | 20 | 8:1 | 6.74 | 186 | 64.73 | 0.14 | 91% |
| Example 23 | Dispersant 23 | 6.00% | 20 | 3:1 | 6.14 | 211 | 64.35 | 0.66 | 91% |
| Example 24 | Dispersant 24 | 6.00% | 20 | 1:1 | 7.77 | 219 | 64.50 | 0.78 | 91% |
| Example 25 | Dispersant 25 | 6.00% | 20 | 0.2:1 | 6.22 | 219 | 65.63 | 0.61 | 92% |
| Example 26 | Dispersant 26 | 6.00% | 20 | 0.1:1 | 2.38 | 206 | 65.07 | 0.69 | 92% |
| Comparative Example 1 | / | 0.00% | / | / | 10.00 | 500 | 60.00% | 2 | 88% |

Note:
$T_{total}$ indicates the total stirring time in min for formation of the positive electrode slurry composition;
W denotes the solid content of the slurry in %;
Z denotes the resistivity of the positive electrode plate in $\Omega \cdot cm$;
K denotes the capacity retention of batteries after 1000 cycles at 25° C. in %.

As can be seen from Table 1, the dispersant provided in the examples of the present application can increase the solid content of the slurry, so that the slurry has better stability. Moreover, the slurry can enable the electrode plate to have lower resistance, as well as also enable the battery to have better capacity retention and cycle performance.

Although the present application has been described with reference to the preferred embodiments, various improvements may be made thereto and parts thereof may be replaced with equivalents without departing from the scope of the present application. In particular, as long as there is no structural conflict, each of the technical features mentioned in the various embodiments can be combined in any manner. The present application is not limited to the particular embodiments disclosed herein, but includes all technical solutions falling within the scope of the claims.

What is claimed is:

1. A dispersant, comprising a block copolymer having a first block and a second block, wherein
said first block comprises a first repeating structural unit shown in Formula I) and a second repeating structural unit shown in Formula II):

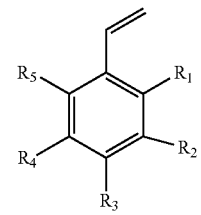

(I)

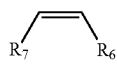

(II)

in which $R_1$, $R_2$, $R_3$, $R_4$, $R_5$, $R_6$ and $R_7$ are independently selected from hydrogen, halogen, cyano, carbonyl, carboxy, nitro, sulfonyl, amide, ester, substituted or unsubstituted $C_1$-$C_{15}$ alkyl, substituted or unsubstituted $C_1$-$C_{15}$ alkoxy, and substituted or unsubstituted $C_6$-$C_{30}$ aryl; and said second block comprises a third repeating structural unit shown in Formula III) and a fourth repeating structural unit shown in Formula IV):

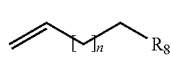

(III)

-continued

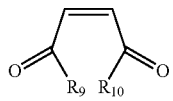
(IV)

in which n represents an average degree of polymerization, that is any integer from 1-25 and $R_8$, $R_9$ and $R_{10}$ have a dipole moment of greater than $2\times10^{-30}$ C·m.

2. The dispersant as claimed in claim 1, wherein $R_1$, $R_2$, $R_3$, $R_4$, $R_5$, $R_6$, and $R_7$ are independently selected from hydrogen, halogen, cyano, substituted or unsubstituted $C_1$-$C_{12}$ alkyl, or substituted or unsubstituted $C_6$-$C_{12}$ aryl.

3. The dispersant as claimed in claim 1, wherein said first repeating structural unit has the following structural formula:

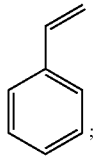

and said second repeating structural unit is ethylene; optionally said first block is a random copolymerization block of said first repeating structural unit and said second repeating structural unit; optionally said first block has a weight average molecular weight in the range of 1000-500000; and optionally said second block has a weight average molecular weight in the range of 1000-500000.

4. The dispersant as claimed in claim 1, wherein said first block and second block have a ratio of an average degree of polymerization in the range of (0.1-10): 1.

5. A method of preparing a dispersant as claimed in claim 1, comprising:

dissolving an initiator and a chain transfer agent in an organic solvent and stirring them under an inert atmosphere to obtain a mixed solution;

adding monomers of a first block to said mixed solution for a first copolymerization reaction;

after the first copolymerization reaction is complete, adding monomers of the second block for a second copolymerization reaction; and after the second copolymerization reaction is complete, the resulting product is precipitated, filtered and dried, thereby obtaining said dispersant.

6. The method as claimed in claim 5, wherein said stirring is carried out at rate in the range of 20 min/rpm-1500 min/rpm;

optionally, the first copolymerization reaction is carried out at a reaction temperature in the range of −20° C. to 120° C.

7. A slurry composition for forming an electrode film layer comprising the dispersant as claimed in claim 1, a binder, an active material, and optionally a conductive agent.

8. The slurry composition as claimed in claim 7, wherein said slurry composition comprises, relative to a total mass of the slurry composition, being 100%:

0.01%-10% of the dispersant;

0.5%-10% of a binder;

82%-91.99% of an active material; and

0%-15% of a conductive agent.

9. The slurry composition as claimed in claim 7, wherein said active material is a positive electrode active material.

10. A method of preparing the slurry composition as claimed in claim 7, comprising:

mixing a conductive agent, the dispersant, and a portion of a solvent with stirring to obtain a first mixture;

adding a binder to said first mixture with stirring for mixing to obtain a second mixture;

adding an active material and the remaining solvent to said second mixture with stirring for mixture to obtain said slurry composition.

11. An electrode plate, comprising, a current collector;

an active material layer, disposed on at least one surface of said current collector, said active material layer being formed from the slurry composition as claimed in claim 7.

12. A secondary battery, comprising, a positive electrode plate;

a negative electrode plate; and a separator, provided between said positive electrode plate and said negative electrode plate;

wherein said positive electrode plate and/or said negative electrode plate are the electrode plate as claimed in claim 11.

13. A battery module comprising the secondary battery as claimed in claim 12.

14. A battery pack comprising the battery module as claimed in claim 13.

15. An electric device comprising the battery pack as claimed in claim 14.

* * * * *